United States Patent
Cheung et al.

(10) Patent No.: US 11,500,780 B2
(45) Date of Patent: *Nov. 15, 2022

(54) RECOVERY OF VALIDITY DATA FOR A DATA STORAGE SYSTEM

(71) Applicant: Western Digital Technologies, Inc., San Jose, CA (US)

(72) Inventors: Caesar Cheuk-Chow Cheung, Irvine, CA (US); Haining Liu, Irvine, CA (US); Subhash Balakrishna Pillai, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,152

(22) Filed: Oct. 30, 2020

(65) Prior Publication Data
US 2021/0049106 A1 Feb. 18, 2021

Related U.S. Application Data

(63) Continuation of application No. 16/455,569, filed on Jun. 27, 2019, now Pat. No. 10,846,238, which is a (Continued)

(51) Int. Cl.
*G06F 12/1009* (2016.01)
*G06F 3/06* (2006.01)
*G06F 12/02* (2006.01)

(52) U.S. Cl.
CPC ........ *G06F 12/1009* (2013.01); *G06F 3/0604* (2013.01); *G06F 3/0631* (2013.01); (Continued)

(58) Field of Classification Search
CPC ............. G06F 12/1009; G06F 12/1036; G06F 12/1072; G06F 12/109; G06F 12/0246; (Continued)

(56) References Cited

U.S. PATENT DOCUMENTS 6,310,921 B1 10/2001 Yoshioka
6,922,768 B2 7/2005 Honda et al.
(Continued)

*Primary Examiner* — Michael Krofcheck
(74) *Attorney, Agent, or Firm* — Morgan, Lewis & Bockius LLP

(57) ABSTRACT

The subject technology provides for recovering a validity table for a data storage system. A set of logical addresses in a mapping table is partitioned into subsets of logical addresses. Each of the subsets of logical addresses is assigned to respective processor cores in the data storage system. Each of the processor cores is configured to check each logical address of the assigned subset of logical addresses in the mapping table for a valid physical address mapped to the logical address, for each valid physical address mapped to a logical address of the assigned subset of logical addresses, increment a validity count in a local validity table associated with a blockset of the non-volatile memory corresponding to the valid physical address, and update validity counts in a global validity table associated with respective blocksets of the non-volatile memory with the validity counts in the local validity table.

19 Claims, 4 Drawing Sheets

Related U.S. Application Data continuation of application No. 15/396,411, filed on Dec. 30, 2016, now Pat. No. 10,380,028.

(52) U.S. Cl.
CPC ........ *G06F 3/0679* (2013.01); *G06F 12/0246* (2013.01); *G06F 2212/1008* (2013.01); *G06F 2212/1056* (2013.01); *G06F 2212/202* (2013.01); *G06F 2212/657* (2013.01); *G06F 2212/7201* (2013.01); *G06F 2212/7209* (2013.01)

(58) Field of Classification Search
CPC ........ G06F 12/02; G06F 12/00; G06F 3/0604; G06F 3/0644; G06F 3/0679; G06F 3/0614; G06F 3/0617; G06F 3/0619; G06F 3/0632; G06F 2212/1008; G06F 2212/202; G06F 2212/657
See application file for complete search history.

(56) References Cited

U.S. PATENT DOCUMENTS

| | | |
|---|---|---|
| 8,751,755 B2 | 6/2014 | Prins |
| 8,793,429 B1 | 7/2014 | Call et al. |
| 8,966,205 B1 | 2/2015 | Lo |
| 9,830,187 B1 | 11/2017 | Blaine |
| 9,940,261 B2 | 4/2018 | Booth |
| 2004/0030823 A1 | 2/2004 | Honda |
| 2009/0287874 A1 | 11/2009 | Rogers |
| 2011/0289255 A1 | 11/2011 | Wang |
| 2013/0311705 A1 | 11/2013 | Cheng |
| 2013/0326121 A1 | 12/2013 | Cheng |
| 2014/0258588 A1 | 9/2014 | Tomlin et al. |
| 2016/0226518 A1 | 8/2016 | Master |
| 2016/0267004 A1* | 9/2016 | Perlstein ............. G06F 12/0246 |
| 2017/0322888 A1 | 11/2017 | Booth |

* cited by examiner

US 11,500,780 B2

RECOVERY OF VALIDITY DATA FOR A DATA STORAGE SYSTEM

CROSS REFERENCE TO RELATED APPLICATION

This application is a continuation of application Ser. No. 16/455,569, filed on Jun. 27, 2019, now U.S. Pat. No. 10,846,238, which is a continuation of application Ser. No. 15/396,411, filed on Dec. 30, 2016, now U.S. Pat. No. 10,380,028, the entirety of each of which is incorporated herein by reference for all purposes.

TECHNICAL BACKGROUND

The present disclosure relates generally to recovering validity data for a data storage system.

BACKGROUND

Data storage systems, such as solid state drives (SSD), maintain a mapping table that maps logical addresses of a host system to physical addresses in the data storage systems. The mapping table is updated when data is allocated from one location to another in non-volatile memory. Data storage systems also maintain a validity table that indicates numbers of valid logical addresses in blocksets of the data storage systems.

SUMMARY

Aspects of the subject technology relate to a method for managing a data storage system. The method may include partitioning a set of logical addresses in a mapping table into a plurality of subsets of logical addresses. The mapping table maps logical addresses of the set of logical addresses to respective physical addresses of non-volatile memory in the data storage system. The method may also include assigning each of the plurality of subsets of logical addresses to respective processor cores in the data storage system. The method may further include issuing instructions to each of the processor cores, wherein each of the processor cores is configured to execute the respective instructions to check each logical address of the assigned subset of logical addresses in the mapping table for a valid physical address mapped to the logical address, for each valid physical address mapped to a logical address of the assigned subset of logical addresses, increment a validity count in a local validity table associated with a blockset of the non-volatile memory corresponding to the valid physical address, and update validity counts in a global validity table associated with respective blocksets of the non-volatile memory with the validity counts in the local validity table.

In certain aspects, the subject technology also relates to a data storage system is provided. The data storage system may include means for partitioning a set of logical addresses in a mapping table into a plurality of subsets of logical addresses. The mapping table maps logical addresses of the set of logical addresses to respective physical addresses of non-volatile memory in the data storage system. The data storage system may also include means for assigning each of the plurality of subsets of logical addresses to respective processor cores in the data storage system. The data storage system may further include means for issuing instructions to each of the processor cores, wherein each of the processor cores is configured to execute the respective instructions to check each logical address of the assigned subset of logical addresses in the mapping table for a valid physical address mapped to the logical address, for each valid physical address mapped to a logical address of the assigned subset of logical addresses, increment a validity count in a local validity table associated with a blockset of the non-volatile memory corresponding to the valid physical address, and update validity counts in a global validity table associated with respective blocksets of the non-volatile memory with the validity counts in the local validity table.

Aspects of the subject technology also relate to a data storage system including a plurality of storage devices, each storage device comprising a plurality of non-volatile memory die, and a controller coupled to the plurality of storage devices. The controller may be configured to partition a set of logical addresses in a mapping table into a plurality of subsets of logical addresses. The mapping table maps logical addresses of the set of logical addresses to respective physical addresses of non-volatile memory in the data storage system. The controller may further be configured to assign each of the plurality of subsets of logical addresses to respective processor cores in the data storage system. The controller may also be configured to issue instructions to each of the processor cores, wherein each of the processor cores is configured to execute the respective instructions to check each logical address of the assigned subset of logical addresses in the mapping table for a valid physical address mapped to the logical address, for each valid physical address mapped to a logical address of the assigned subset of logical addresses, increment a validity count in a local validity table associated with a blockset of the non-volatile memory corresponding to the valid physical address, and update validity counts in a global validity table associated with respective blocksets of the non-volatile memory with the validity counts in the local validity table.

It is understood that other configurations of the present disclosure will become readily apparent to those skilled in the art from the following detailed description, wherein various configurations of the present disclosure are shown and described by way of illustration. As will be realized, the present disclosure is capable of other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details. In some instances, structures and components are shown in block diagram form in order to avoid obscuring the concepts of the subject technology. Like components are labeled with identical element numbers for ease of understanding.

Controllers manage data storage devices, such as solid state drives (SSD), and perform data operations on non-volatile memory, such as NAND flash memory, of the data storage devices. Controllers maintain a mapping table that maps logical addresses to respective physical addresses. Controllers may also maintain validity tables that track the amount of valid data stored in non-volatile memory. Validity tables may be used to select candidate blocks for garbage collection operations.

While a data storage system is in operation, a mapping table and a validity table may be stored in volatile memory of the data storage system. When the data storage system experiences a planned shutdown (e.g., based on power down instructions), a controller of the data storage system may transfer the mapping table and the validity table from the volatile memory to non-volatile memory. During the subsequent power on, the controller may transfer the mapping table and the validity table from the non-volatile memory to the volatile memory. However, when the data storage system experiences an unplanned shutdown (e.g., abrupt shutdown), the data storage system may have enough energy to save the mapping table to the non-volatile memory, but may not have enough energy to transfer the validity table to the non-volatile memory. Accordingly, the data on the validity table may be lost, and the controller may need to recover the validity table at the time of subsequent power on. The subject technology improves performance of data storage systems, for example, by recovering validity data utilizing multiple processor cores according to the processes described herein.

Figure 1:
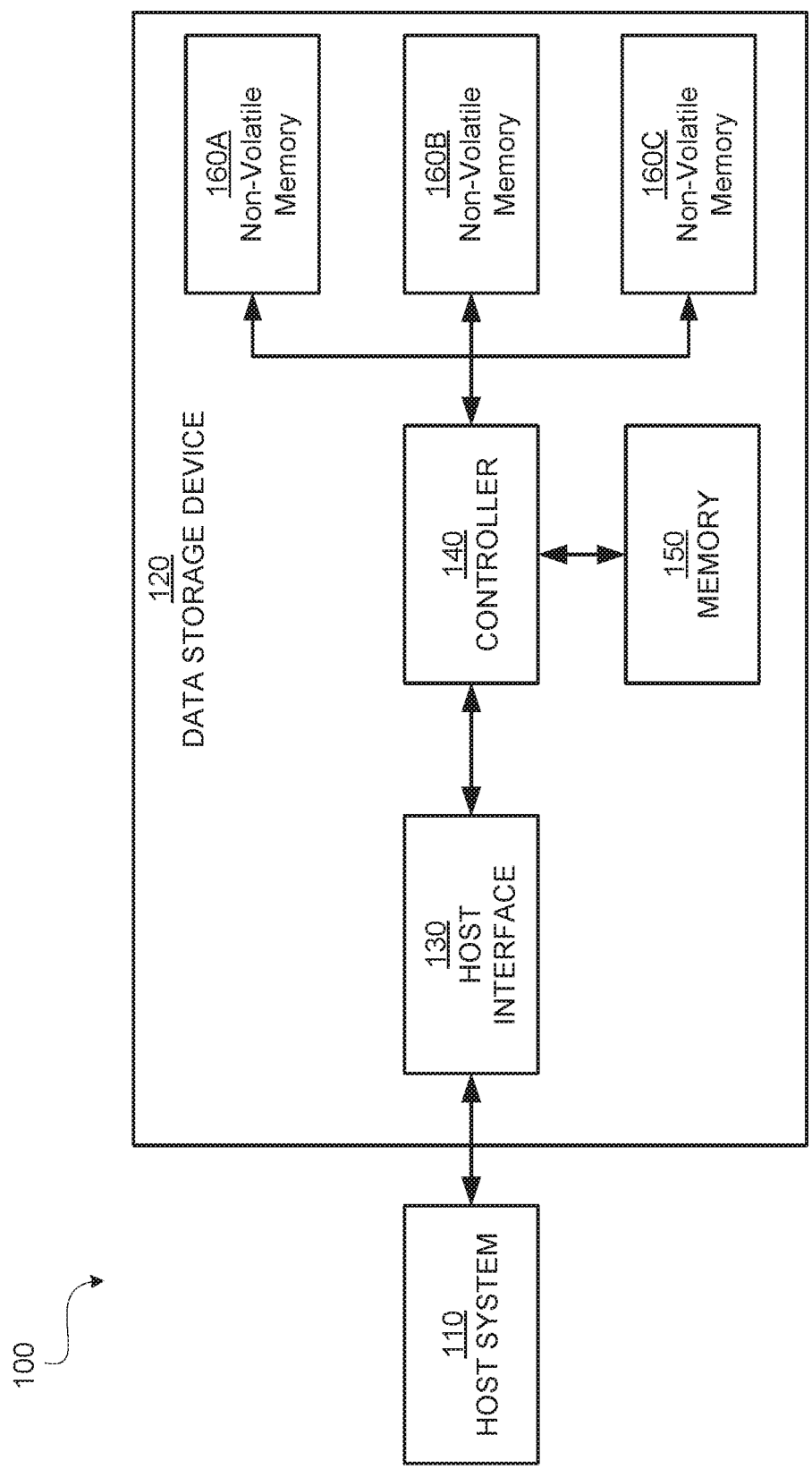
FIG. 1 is a block diagram depicting components of a data storage system according to aspects of the subject technology.

FIG. 1 is a block diagram depicting components of an example data storage system 100 according to various implementations of the subject technology. Data storage system 100 may include host system 110 and data storage device 120. Data storage device 120 (for example, a solid state drive) may include host interface 130, controller 140, memory 150, and non-volatile memory 160A-160C.

Host system 110 represents any device configured to be coupled to data storage system 120 for storing data, to send data to and receive data from data storage system 120 via host interface 130. Host system 110 may be a computing system such as a personal computer, a server, a workstation, a laptop computer, PDA, smart phone, and the like. Alternatively, host system 110 may be an electronic device such as a digital camera, a digital audio player, a digital video recorder, and the like.

Host interface 130 may include both electrical and physical connections for operably coupling host system 110 to controller 140. Host interface 130 may be configured to communicate data, addresses, and control signals between host system 110 and controller 140. Host interface 130 may use any proprietary or standard interface protocols including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS), and Peripheral Component Interconnect Express (PCIe).

According to aspects of the subject technology, host interface 130 may implement a wireless connection between host system 110 and data storage device 120 using standardized or proprietary wireless interface standards and protocols. In this regard, host interface 130 or other components of data storage device 120 may include a wireless transceiver to place host system 110 and data storage device 120 in wireless communication with each other.

Controller 140 is configured to store data received from host system 110 in non-volatile memory 160A-160C in response to a write command from host system 110, and to read data stored in non-volatile memory 160A-160C and to transfer the read data to host system 110 via host interface 130 in response to a read command from host system 110. Controller 140 may include several internal components (not shown) such as multiple processor cores, read-only memory (ROM), a flash component interface (for example, a multiplexer to manage instruction and data transport along a connection to non-volatile memory 160A-160C), an I/O interface, error correction code (ECC) module, and the like. The ECC module may be configured to generate code words to be stored in non-volatile memory 160A-160C from data received from host system 110 and to decode code words read from non-volatile memory 160A-160C before sending the decoded data to the host system 110. Various ECC solutions may be used to encode and decode data to generate the code words. In some aspects, one or more elements of controller 140 may be integrated into a single chip. In other aspects, the elements may be implemented on multiple discrete components.

Controller 140, using multiple processor cores for example, may be configured to execute code or instructions to perform the operations and functionality described herein, manage request flow and address mappings, and to perform calculations and generate commands. The multiple processor cores of controller 140 may be configured to monitor and control the operation of the components in the controller 140 and data storage device 120. Controller 140 may include a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or a combination of the foregoing.

Sequences of instructions may be stored as firmware on ROM within controller 140. Sequences of instructions also may be stored and read from memory 150, non-volatile memory 160A-160C, or received from host system 110 (for example, via a host interface 130). ROM, memory 150, non-volatile memory 160A-160C, represent examples of machine or computer readable media on which instructions/code executable by controller 140 may be stored. Machine or computer readable media may generally refer to any tangible and/or non-transitory media used to provide instructions to controller 140, its processor, including both volatile media, such as dynamic memory used for memory 150 or for buffers within controller 140, and non-volatile media, such as electronic media, optical media, and magnetic media.

Controller 140 may use memory 150 for temporary storage of data and information used to manage data storage device 120. In some aspects, memory 150 represents volatile memory used to temporarily store data and information used to manage data storage device 120. According to aspects of the subject technology, memory 150 may be random access memory (RAM) such as double data rate (DDR) RAM. Other types of RAM also may be used to implement memory 150. Memory 150 may be implemented using a single RAM module or multiple RAM modules. While memory 150 is depicted as being distinct from controller 140, those skilled in the art will recognize that memory 150 may be incorporated into controller 140 without departing from the scope of the present disclosure. Alternatively, memory 150 may be a non-volatile memory such as a magnetic disk, flash memory, and the like.

Non-volatile memory 160A-160C represent non-volatile memory devices for storing data. The number of non-volatile memory in data storage device 120 may be any number such as two, four, eight, sixteen, etc. For simplicity of discussion, non-volatile memory 160A-160C are depicted in FIG. 1. Non-volatile memory 160A-160C are not limited to any particular capacity or configuration. Each of non-volatile memory 160A-160C may be organized into blocks and pages. Each of blocks may include a number of pages, for example 256, and each of pages may contain one or more sectors or portions of data.

According to aspects of the subject technology, non-volatile memory 160A-160C include, for example, NAND flash memory. Non-volatile memory 160A-160C may comprise multilevel cell (MLC) flash memory and/or three-level cell (TLC) memory. In some aspects non-volatile memory 160A-160C may further comprise three-dimensional (3D) flash memory. In some aspects, non-volatile memory 160A-160C may comprise one or more hybrid memory devices that can function in one or more of a SLC, MLC, or TLC mode. The subject technology is not limited to these types of memory and may be applied to flash memory cells configured and operated using more than three levels (e.g., 4 bits per cell, 5 bits per cell, etc.).

Figure 2:
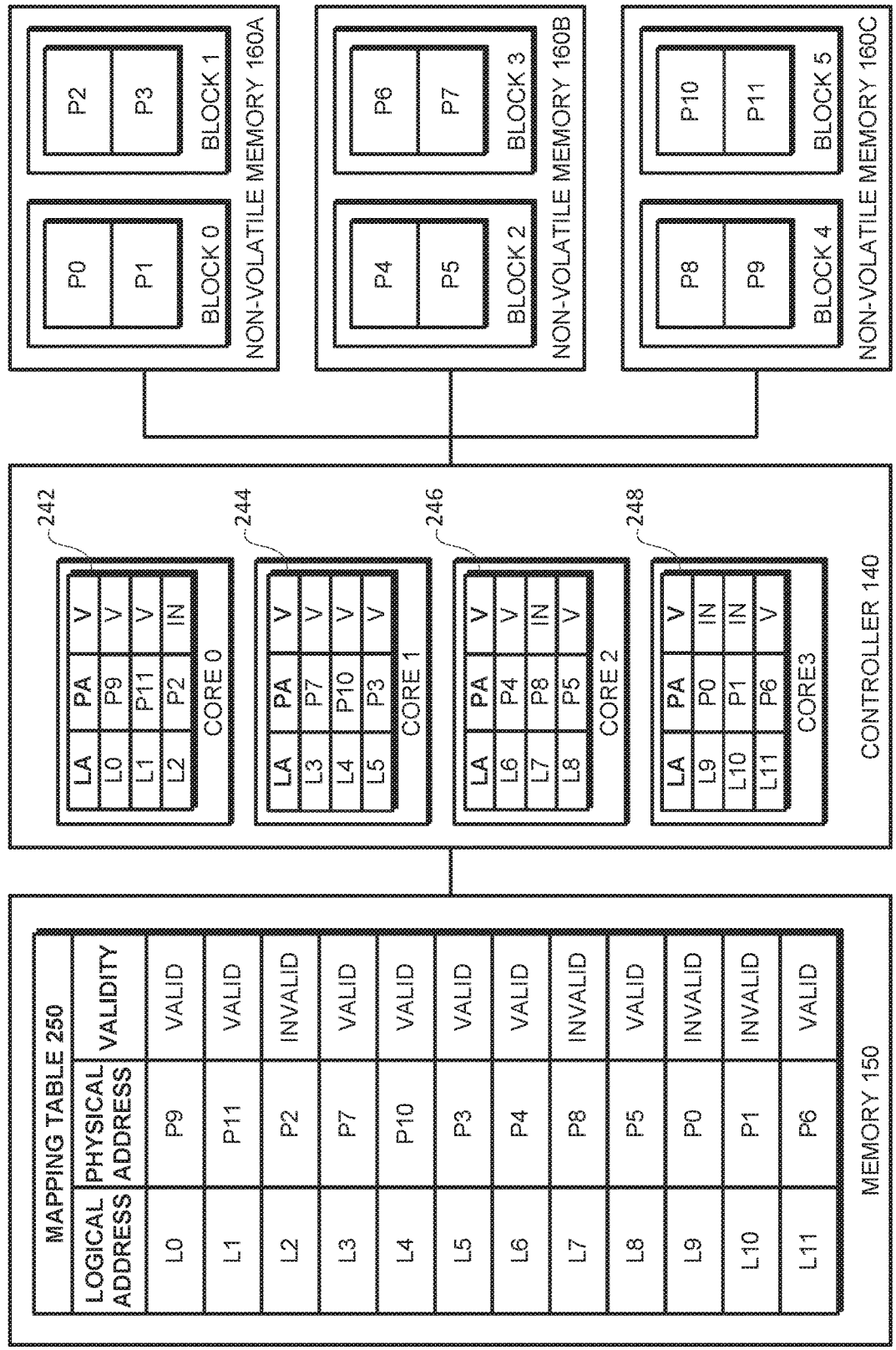
FIG. 2 is a conceptual view depicting an example partitioning of a mapping table according to aspects of the subject technology.

FIG. 2 is a conceptual view depicting an example partitioning of mapping table 250 according to aspects of the subject technology. Host system 110 may use logical addressing for data commands sent to data storage device 120. Data storage device 120 may map logical addresses received from host system 110 to physical addresses of memory locations in non-volatile memory 160A-160C in a form of mapping table 250.

Mapping table 250 may be stored in memory 150 and may be accessible by controller 140. Mapping table 250 may include three columns: logical address; physical address; and validity. A first column of mapping table 250 may be logical addresses and include logical addresses L0-L11 used by host system 110 in data commands. Mapping table 250 may be indexed by logical addresses in a sequential order. A second column of mapping table 250 may be physical addresses and include physical pages P0-P11 of non-volatile memory 160A-160C. Physical addresses P0-P11 may be mapped to corresponding logical addresses L0-L11. For example, host system 110 may send a data command to write data of L0. In response to the data command, controller 140 of data storage device 120 writes the data of L0 to page P9 of block 4 of non-volatile memory 160C. Controller 140 may map physical address of page P9 to logical address L0 in mapping table 250. A third column of mapping table 250 may indicate validity of data in the physical addresses.

The term "valid" under the validity column indicates that the corresponding physical address has valid data. On the other hand, the term "invalid" under the validity column indicates that the corresponding physical address has invalid data. For example, controller 140 may reprogram data stored in page P2 of block 1 in non-volatile memory 160A to page P5 of block 3 in no-volatile memory 160B. Controller 140 may mark data of page P2 as "invalid" until a garbage collection operation is performed to block 1. When controller 140 receives an indication from non-volatile memory 160A that an error was encountered during a data operation to page P2, and controller attempts to recover the data. When the data recovery fails, controller 140 may mark page P2 as a bad page and mark data of page P2 as "invalid." In some aspects, host system 110 may send a command to controller 140 to delete data stored in page P2, and controller 140 may mark data of page P2 as "invalid."

In some aspects, all of logical addresses L0-L11 may not be mapped to physical addresses. For example, controller 140 may include only logical addresses that are mapped to physical addresses to mapping table 250. In other words, all of physical addresses in mapping table 250 include valid data.

For discussion purposes, each of non-volatile memory 160A-160C includes two blocks (i.e., blocks 0 and 1 in non-volatile memory 160A, blocks 2 and 3 in non-volatile memory 160B, and blocks 4 and 5 in non-volatile memory 160C) as depicted in FIG. 2. Further, for example, each of blocks 0-5 in non-volatile memory 160A-160C includes two pages (i.e., pages P0 and P1 in block 0, pages P2 and P3 in block 1, pages P4 and P5 in block 2, pages P6 and P7 in block 3, pages P8 and P9 in block 4, pages P10 and P11 in block 5). The number of non-volatile memory per data storage device, the number of blocks per die, the number of pages per block, the number of sectors per page, and/or the size of the sectors are not limited to the numbers depicted in FIG. 2, and the numbers may vary. Controller 140 may include four processor cores (i.e., cores 0-3) as depicted in FIG. 2. The number of processor cores in controller 140 is not limited to four, and the number may vary.

Controller 140 may partition mapping table 250 using logical addresses (i.e., L0-L11). The number of partitions may correspond to the number of cores assigned the task of recovery of a validity table. For example, controller 140 may force or assign all cores to process the validity table recovery operation. Thus, mapping table 250 is partitioned into four subsets of logical addresses. In some aspects, controller 140 may task cores that are available. For example, controller 140 may determine cores based on availability at the time of validity table recovery. The availability of cores may depend on whether the cores are performing an operation at the time of partitioning mapping table 250. In some other aspects, controller 140 may designate certain cores for recovery of the validity table. For example, controller 140 designates cores 0 and 2 for recovery of the validity table, and thus, mapping table 250 may be partitioned into two subsets of logical addresses.

Each of the subsets of mapping table 250 may be assigned to respective cores tasked with validity table recovery operation. For example, as depicted in FIG. 2, mapping table 250 is partitioned into four subsets (e.g., subset 242, subset 244, subset 246, subset 248) of logical addresses L0-L11 based on four cores (i.e., cores 0-3) in controller 140. Subsets 242-248 are assigned to cores 0-3, respectively, in FIG. 2. For example, subset 242 includes logical addresses (LA) L0-L2.

In addition to a subset of logical addresses, each of subsets 242-248 may also include corresponding physical addresses and corresponding data validity information. For example, corresponding physical addresses and corresponding data validity information may be transferred to each of cores 0-3 at the time subsets 242-248 are assigned to the cores. In some aspects, each of cores 0-3 may refer back to mapping table 250 at the time of checking the validity of data stored in the physical addresses.

Figure 3:
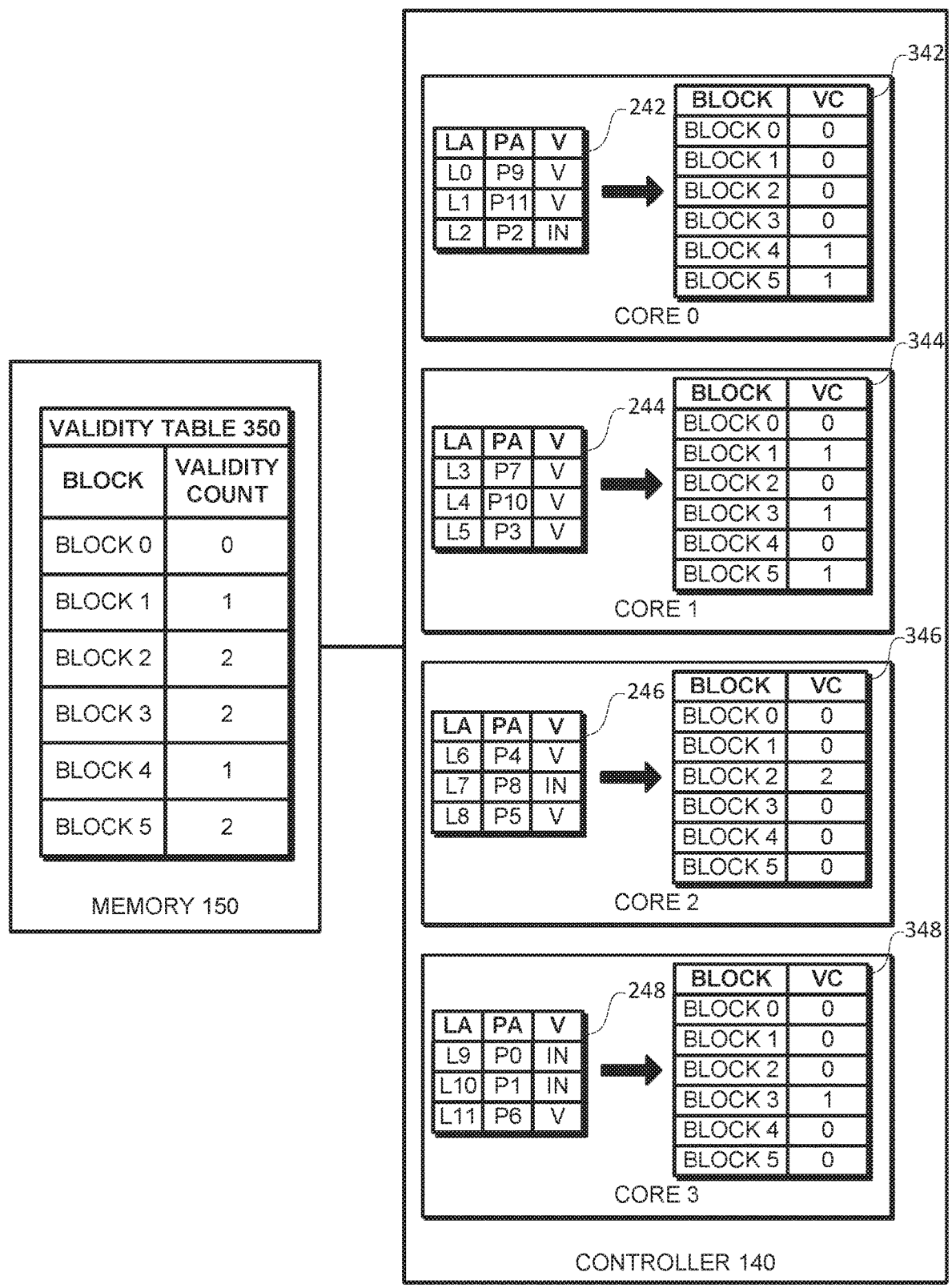
FIG. 3 is a conceptual illustrating an example recovery of a validity table according to aspects of the subject technology.

FIG. 3 is a conceptual view depicting an example recovery of a validity table 350 according to aspects of the subject technology. Based on respective subsets 242-248, cores 0-3 may create sub-tables 342-348, respectively. Each of sub-tables 342-348 includes a first column that indicates blocks 0-5 in non-volatile memory 160A-160C, and a second column that indicates validity counts (VC) for each of blocks 0-5.

For example, core 0 determines physical addresses mapped to the assigned logical addresses L0-L2 using mapping table 250. When core 0 determines that physical addresses P9, P11, and P2 are mapped to logical addresses L0-L2, respectively, core 0 obtains validity of the physical addresses P9, P11, and P2 using mapping table 250. For example, based on mapping table 250 or subset 242, core 0 may identify that physical addresses P9 and P11 include valid data. For example, core 0 determines that physical addresses P9 and P11 to which logical addresses L0 and L1 are mapped belong to blocks 4 and 5, respectively. Core 0 increments validity counts for blocks 4 and 5 on sub-table 342.

Once cores 0-3 create sub-tables (e.g., local validity table) 342-348 and increment validity counts for blocks associated with logical addresses including valid data, cores 0-3 updates validity table 350 (e.g., global validity table). In some aspects, sub-tables 342-348 may list only blocks with valid data. For example, sub-table 342 may list only block 4 and block 5 instead listing blocks 0-5. Controller 140 may designate one of cores 0-3 to be a master core, and the master core may collect sub-tables or data included in the sub-tables from other cores and sum validity counts for respective blocks. The master core then may access memory 150 and updates validity table 350 with the results of the sum. For example, core 3 may be designated as a master core. Cores 0-2 may send data from respective sub-tables 342-346 to core 3. Core 3 sums the validity counts for each of blocks 0-5 based on the data from sub-tables 342-348. Core 3 accesses memory 150 and updates validity table 350 with the validity count results from sub-tables 342-348.

Alternatively, cores 0-3 may access memory 150 and update validity table 350 individually. For example, controller 140 and memory 150 may be arranged to allow cores 0-3 to parallel or simultaneous access memory 150 using multiple ports or allow cores 0-3 to sequentially access memory 150 using a single port. Although subsets 242-248 and sub-tables 342-348 are depicted to be included in respective cores 0-3, subsets 242-248 and sub-tables 342-348 may be stored in internal memory of controller 140 and may be accessible by respective cores 0-3.

Figure 4:
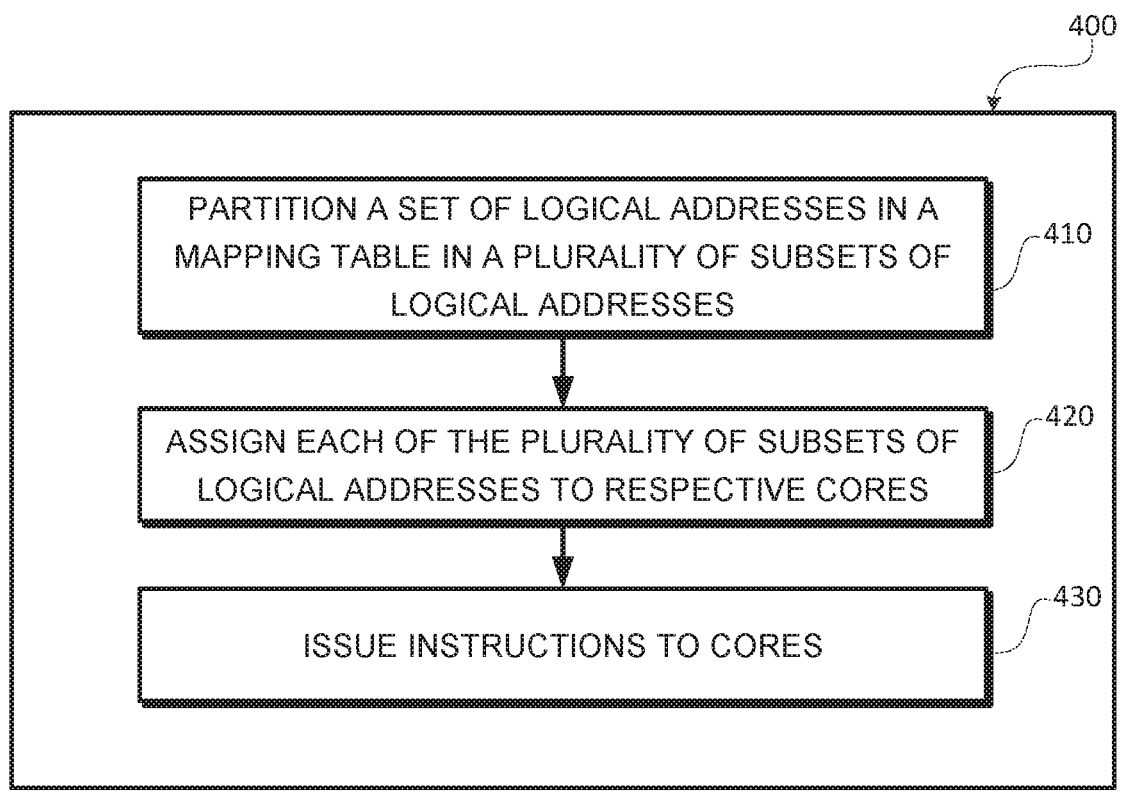
FIG. 4 depicts a flow diagram of an example process for recovering a validity table in a data storage system according to aspects of the subject technology.

FIG. 4 depicts a flow diagram of an example process for recovering a validity table in a data storage system according to aspects of the subject technology. For explanatory purposes, the various blocks of example process 400 are described herein with reference to the components and/or processes described herein. The one or more of the blocks of process 400 may be implemented, for example, by one or more processors, including, for example, controller 140 of FIG. 1 or one or more components or processors of controller 140. In some implementations, one or more of the blocks may be implemented apart from other blocks, and by one or more different processors or controllers. Further for explanatory purposes, the blocks of example process 400 are described as occurring in serial, or linearly. However, multiple blocks of example process 400 may occur in parallel. In addition, the blocks of example process 400 need not be performed in the order shown and/or one or more of the blocks of example process 400 need not be performed.

At block 410, a controller partitions a set of logical addresses in a mapping table in a plurality of subsets of logical addresses. For example, controller 140 partitions logical addresses L0-L11 in mapping table 250 in subsets 242-248. The number of subsets may be based on the number of cores in controller 140. The logical addresses in respective subsets 242-248 are in sequential order. At block 420, the controller assigns each of the plurality of subsets of logical addresses to respective cores. For example, controller 140 assigns subsets 242-248 to cores 0-3, respectively. At block 430, the controller issues instructions to each processor cores to execute recovery of validity table. In some aspects, controller 140 may designate one of cores 0-3 to be a master core to manage other cores in recovering validity table 350.

Figure 5:
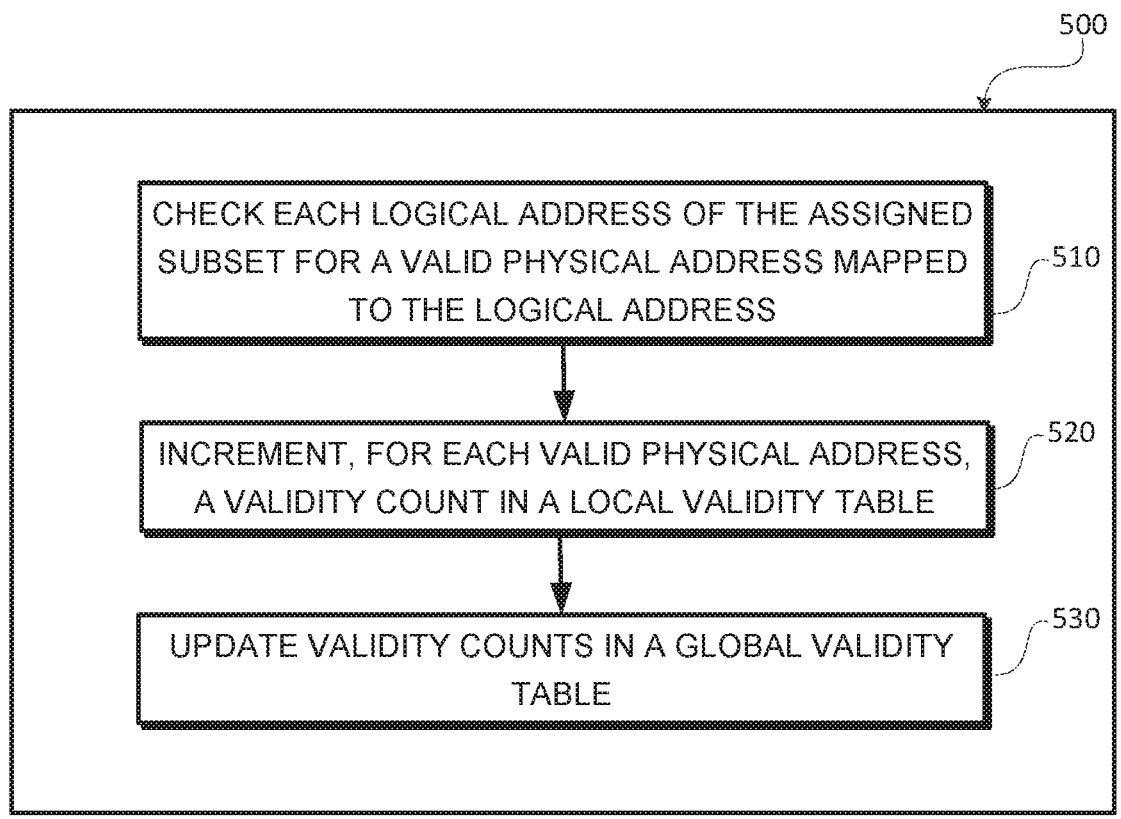
FIG. 5 depicts a flow diagram of an example process for recovering a validity table in a data storage system according to aspects of the subject technology.

FIG. 5 depicts a flow diagram of an example process for recovering a validity table in a data storage system according to aspects of the subject technology. For explanatory purposes, the various blocks of example process 500 are described herein with reference to the components and/or processes described herein. The one or more of the blocks of process 500 may be implemented, for example, by one or more processors, including, for example, controller 140 of FIG. 1 or one or more components or processors of controller 140. In some implementations, one or more of the blocks may be implemented apart from other blocks, and by one or more different processors or controllers. Further for explanatory purposes, the blocks of example process 500 are described as occurring in serial, or linearly. However, multiple blocks of example process 500 may occur in parallel. In addition, the blocks of example process 500 need not be performed in the order shown and/or one or more of the blocks of example process 500 need not be performed.

At block 510, each of processor cores check each logical address of the assigned subset for a valid physical address mapped to the logical address based on the instructions from the controller. For example, cores 0-3 refer to mapping table 250 for physical addresses mapped to respective logical addresses. Cores 0-3 may also check the validity of the physical address associated to the logical addresses.

At block 520, each of processor cores increment, for each valid physical address, a validity count in a local validity table. For example, each of cores 0-3 may determine blocks in non-volatile memory to which the physical address points. Each of cores 0-3 increments validity counts of blocksets in a local validity table stored in each of cores 0-3, or in internal memory of controller 140 to which each of cores 0-3 are accessible.

At block 530, each of processor cores updates validity counts in a global validity table. For example, cores 0-3 may update validity counts in a global validity table stored in memory 150 with the respective local validity. Alternatively, one of cores 0-3 designated as a master core accumulates validity counts from respective local validity table from the remaining cores, and update the global validity table.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader).

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an implementation may apply to all aspects, or one or more aspects. An implementation may provide one or more examples. A phrase such as an "embodiment" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A data storage system, comprising:
   a memory; and
   a controller configured to cause:
   arranging a set of logical addresses into a plurality of subsets of logical addresses, logical addresses of the set of logical addresses being associated with respective physical addresses of the memory;
   assessing each logical address in the plurality of subsets of logical addresses for a valid physical address corresponding to the logical address;
   for each valid physical address corresponding to a logical address of the plurality of subsets of logical addresses, incrementing a validity count in a first validity record associated with a block of the memory corresponding to the valid physical address; and
   providing validity counts in a second validity record associated with respective blocks of the memory with the validity counts in the first validity records,
   wherein:
   one of the validity counts in the second validity record represents a sum of validity counts from at least two of the first validity records;
   the one of the validity counts in the second validity record is associated with at least two blocks of the memory;
   a first one of the at least two blocks belongs to a first memory device of a set of memory devices;
   a second one of the at least two blocks belongs to a second memory device of the set of memory devices; and
   the second memory device is different from the first memory device.

2. The data storage system of claim 1, wherein the second validity record is separate and different from the first validity records, and the second validity record exists concurrently with the first validity records.

3. The data storage system of claim 1, wherein the controller comprises processor cores, and wherein at least one of the processor cores is configured to cause:
   accumulating the validity counts from the respective first validity records; and
   maintaining the validity counts in the second validity record associated with respective blocks of the memory with the accumulated validity counts.

4. The data storage system of claim 1, wherein the controller is configured to cause:
   indexing a record using the set of logical addresses arranged sequentially; and
   identifying a respective starting index and a respective ending index from the set of logical addresses corresponding to the respective subset of logical addresses assigned to each processor core.

5. The data storage system of claim 1, wherein the controller is configured to cause:
   designating each of the plurality of subsets of logical addresses to a respective processor core in the data storage system,
   wherein a number of partitions of the logical addresses corresponds to a number of processor cores, wherein the controller is configured to determine a number of available processor cores in the data storage system, and wherein the number of processor cores is the number of available processor cores.

6. The data storage system of claim 1, wherein the controller is configured to cause: partitioning the set of logical addresses after an occurrence of an abnormal shutdown of the data storage system.

7. The data storage system of claim 1, wherein the memory comprises a plurality of memory devices, and wherein each of the blocks comprises a respective physical block from one of the plurality of memory devices.

8. The data storage system of claim 7, wherein each physical address is configured to identify a physical data unit, and wherein each physical block comprises a plurality of physical data units.

9. The data storage system of claim 1, wherein:
the first one of the at least two blocks is associated with a first subset of the plurality of subsets of logical addresses; and
the second one of the at least two blocks is associated with a second subset of the plurality of subsets of logical addresses.

10. A machine-implemented method, comprising:
arranging a set of logical addresses into a plurality of subsets of logical addresses, logical addresses of the set of logical addresses being associated with respective physical addresses of a memory of a data storage system;
assessing each logical address in the plurality of subsets of logical addresses for a valid physical address corresponding to the logical address;
for each valid physical address corresponding to a logical address of the plurality of subsets of logical addresses, incrementing a validity count in a first validity record associated with a block of the memory corresponding to the valid physical address; and
providing validity counts in a second validity record associated with respective blocks of the memory with the validity counts in the first validity records,
wherein:
one of the validity counts in the second validity record represents a sum of validity counts from at least two of the first validity records;
the one of the validity counts in the second validity record is associated with at least two blocks of the memory;
a first one of the at least two blocks belongs to a first memory device of a set of memory devices;
a second one of the at least two blocks belongs to a second memory device of the set of memory devices; and
the second memory device is different from the first memory device.

11. The machine-implemented method of claim 10, wherein the second validity record is separate from the first validity records, and the second validity record exists concurrently with the first validity records.

12. The machine-implemented method of claim 10, comprising:
accumulating the validity counts from the respective first validity records; and
maintaining the validity counts in the second validity record associated with respective blocks of the memory with the accumulated validity counts.

13. The machine-implemented method of claim 10, comprising:
indexing a record using the set of logical addresses arranged sequentially; and
identifying a respective starting index and a respective ending index from the set of logical addresses corresponding to the respective subset of logical addresses assigned to each processor core.

14. The machine-implemented method of claim 10, comprising:
designating each of the plurality of subsets of logical addresses to a respective processor core in the data storage system,
wherein a number of partitions of the logical addresses corresponds to a number of processor cores, wherein the machine-implemented method comprises determining a number of available processor cores in the data storage system, and wherein the number of processor cores is the number of available processor cores.

15. The machine-implemented method of claim 10, comprising:
detecting a prior abnormal shutdown of the data storage system; and
partitioning the set of logical addresses in response to detecting the prior abnormal shutdown.

16. An apparatus, comprising:
means for arranging a set of logical addresses into a plurality of subsets of logical addresses, logical addresses of the set of logical addresses being associated with respective physical addresses of a memory of a data storage system;
means for assessing each logical address in the plurality of subsets of logical addresses for a valid physical address corresponding to the logical address;
for each valid physical address corresponding to a logical address of the plurality of subsets of logical addresses, means for incrementing a validity count in a first validity record associated with a block of the memory corresponding to the valid physical address; and
means for providing validity counts in a second validity record associated with respective blocks of the memory with the validity counts in the first validity records,
wherein:
one of the validity counts in the second validity record represents a sum of validity counts from at least two of the first validity records;
the one of the validity counts in the second validity record is associated with at least two blocks of the memory;
a first one of the at least two blocks belongs to a first memory device of a set of memory devices;
a second one of the at least two blocks belongs to a second memory device of the set of memory devices; and
the second memory device is different from the first memory device.

17. The apparatus of claim 16, wherein the second validity record is separate from the first validity records, and the second validity record exists concurrently with the first validity records.

18. The apparatus of claim 16, comprising:
means for accumulating the validity counts from the respective first validity records; and
means for maintaining the validity counts in the second validity record associated with respective blocks of the memory with the accumulated validity counts.

19. The apparatus of claim 16, comprising:
means for indexing a record using the set of logical addresses arranged sequentially; and
means for identifying a respective starting index and a respective ending index from the set of logical addresses corresponding to the respective subset of logical addresses assigned to each processor core.

* * * * *